United States Patent
Mohammad et al.

(10) Patent No.: US 11,347,454 B2
(45) Date of Patent: May 31, 2022

(54) CONTROLLER FOR A FULFILMENT SERVICE OPERATION

(71) Applicant: HEWLETT-PACKARD DEVELOPMENT COMPANY, L.P., Houston, TX (US)

(72) Inventors: Nassir Mohammad, Bristol (GB); Joshua Serratelli Schiffman, Bristol (GB); Adrian Baldwin, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 873 days.

(21) Appl. No.: 16/076,987

(22) PCT Filed: Apr. 27, 2017

(86) PCT No.: PCT/US2017/029885
§ 371 (c)(1),
(2) Date: Aug. 9, 2018

(87) PCT Pub. No.: WO2018/199961
PCT Pub. Date: Nov. 1, 2018

(65) Prior Publication Data
US 2021/0200484 A1    Jul. 1, 2021

(51) Int. Cl.
*G06F 3/12* (2006.01)
*G06F 21/34* (2013.01)

(52) U.S. Cl.
CPC .......... *G06F 3/1238* (2013.01); *G06F 3/1203* (2013.01); *G06F 3/1222* (2013.01);
(Continued)

(58) Field of Classification Search
CPC ......... G02F 1/134309; G02F 1/133707; G02F 1/1339; G02F 1/13394; G02F 1/134336;
(Continued)

(56) References Cited

U.S. PATENT DOCUMENTS 6,836,339 B1   12/2004   Purvis et al.
7,738,127 B2   6/2010   Winkel et al.
(Continued)

FOREIGN PATENT DOCUMENTS

EP   3131002   2/2017

OTHER PUBLICATIONS

Internet Printing Protocol (IPP): Job and Printer Administrative Operations (RFC3998) (English (United States)), Published in: Internet Society Requests for Comments, Publication Date: Mar. 1, 2005, Related People: C. Kugler, H. Lewis, T. Hastings.*

(Continued)

*Primary Examiner* — Darryl V Dottin
(74) *Attorney, Agent, or Firm* — HP Inc. Patent Department

(57) ABSTRACT

A controller for a fulfilment service operation is described in which the controller, before initiating fulfilment of the job, operates to determine if an authorised user is present at a fulfilment service device and to determine if the user intends to remain attendant at the fulfilment service device for the duration of fulfilment of the job. If the user moves away from the fulfilment service device, the controller operates to pause the job. If the user remains away from the fulfilment service device for a period of time, the controller operates to cancel the job.

15 Claims, 8 Drawing Sheets

(52) U.S. Cl.
CPC ............ *G06F 3/1267* (2013.01); *G06F 21/34* (2013.01); *G06F 3/12* (2013.01)

(58) Field of Classification Search
CPC ........... G02F 1/134363; G02F 1/13396; G02F 1/134318; G02F 1/134345; G02F 1/134372; G02F 2201/122; G02F 2201/123; G02F 2201/121; G06F 3/1238; G06F 3/1203; G06F 3/1222; G06F 3/1267; G06F 21/34; G06F 3/1204; G06F 3/1288; G06F 2221/2111; G06F 21/608; B41F 33/16; H04L 63/0853
USPC ...................................................... 358/1.14
See application file for complete search history.

(56) References Cited

U.S. PATENT DOCUMENTS

| | | | |
|---|---|---|---|
| 7,986,421 | B2 | 7/2011 | Chen et al. |
| 8,493,583 | B2 | 7/2013 | Moon et al. |
| 8,629,998 | B2 | 1/2014 | Honda et al. |
| 9,424,333 | B1* | 8/2016 | Bisignani ............... G06F 16/248 |
| 2004/0263870 | A1 | 12/2004 | Itoh et al. |
| 2007/0024892 | A1 | 2/2007 | Cho |
| 2007/0256586 | A1 | 11/2007 | Bonikowski et al. |
| 2010/0043066 | A1* | 2/2010 | Miliefsky ........... H04L 63/0263 726/9 |
| 2010/0069116 | A1 | 3/2010 | Silverbrook et al. |
| 2012/0194867 | A1 | 8/2012 | Appleyard |
| 2012/0229852 | A1 | 9/2012 | Kubo et al. |
| 2013/0117400 | A1* | 5/2013 | An .......................... H04L 51/14 709/206 |
| 2015/0163206 | A1* | 6/2015 | McCarthy ............... H04L 63/06 713/171 |

OTHER PUBLICATIONS

Phelps, "How Do I Cancel a Print Job Without Wasting Tons of Paper?", PCWorld, Retrieved from Internet: http://www.pcworld.com/article/209432/cancel_print_job.html, Nov. 1, 2010, 3 Pages.

* cited by examiner

CONTROLLER FOR A FULFILMENT SERVICE OPERATION

BACKGROUND

A fulfilment service may operate in an environment in which a user instructs that a fulfilment service device operates to complete a fulfilment request. A particular example of a fulfilment service comprises a printing service in which a user instructs that a print job should be printed at a specified printer.

In order to prevent wastage and/or preserve confidentiality, fulfilment services can operate to initiate fulfilment of a job only when a user that instructed fulfilment of the job is attendant at a fulfilment service device.

With regard to the particular example of a printing service, pull-print type services may help ensure document security (e.g., by employing methods to inhibit snooping, theft, or the sending of print jobs to wrong destinations) and reduce paper and ink/toner wastage. To achieve this, authentication may be performed by way of a user scanning an authentication token such as, for example, a key card or mobile phone on a reader at a printing device (e.g. a multi-function peripheral device). On presentation of the authentication token at the reader, a list of jobs in a print queue may be displayed on a display of the printing device. Once a job is selected, the job can be printed. In this way, a job in a print queue is released for printing by the printing device only when an authorised user is present at the printing device.

DETAILED DESCRIPTION

Implementations discussed herein include a controller for a fulfilment service operation, which may be employed in a fulfilment service system to control operation of a fulfilment service device. The controller may initiate the processing of a job to be completed by the fulfilment service device when certain conditions are met. The controller may pause and/or cancel processing of a job responsive to a change in at least one of the conditions being monitored. For example, the controller can compare location information of a user authentication token with location information for a fulfilment service device that the user has instructed should carry out fulfilment of a job. If the location information associated with the authentication token satisfies a location policy (e.g. the authentication token is within a particular proximity of the fulfilment service device), then one condition to release the job for completion by the fulfilment service device may be met. Also, the controller can determine if other policies are satisfied, in addition to a location policy, so that if these further conditions are met, the job may be released for completion by the fulfilment service device.

Figure 1:
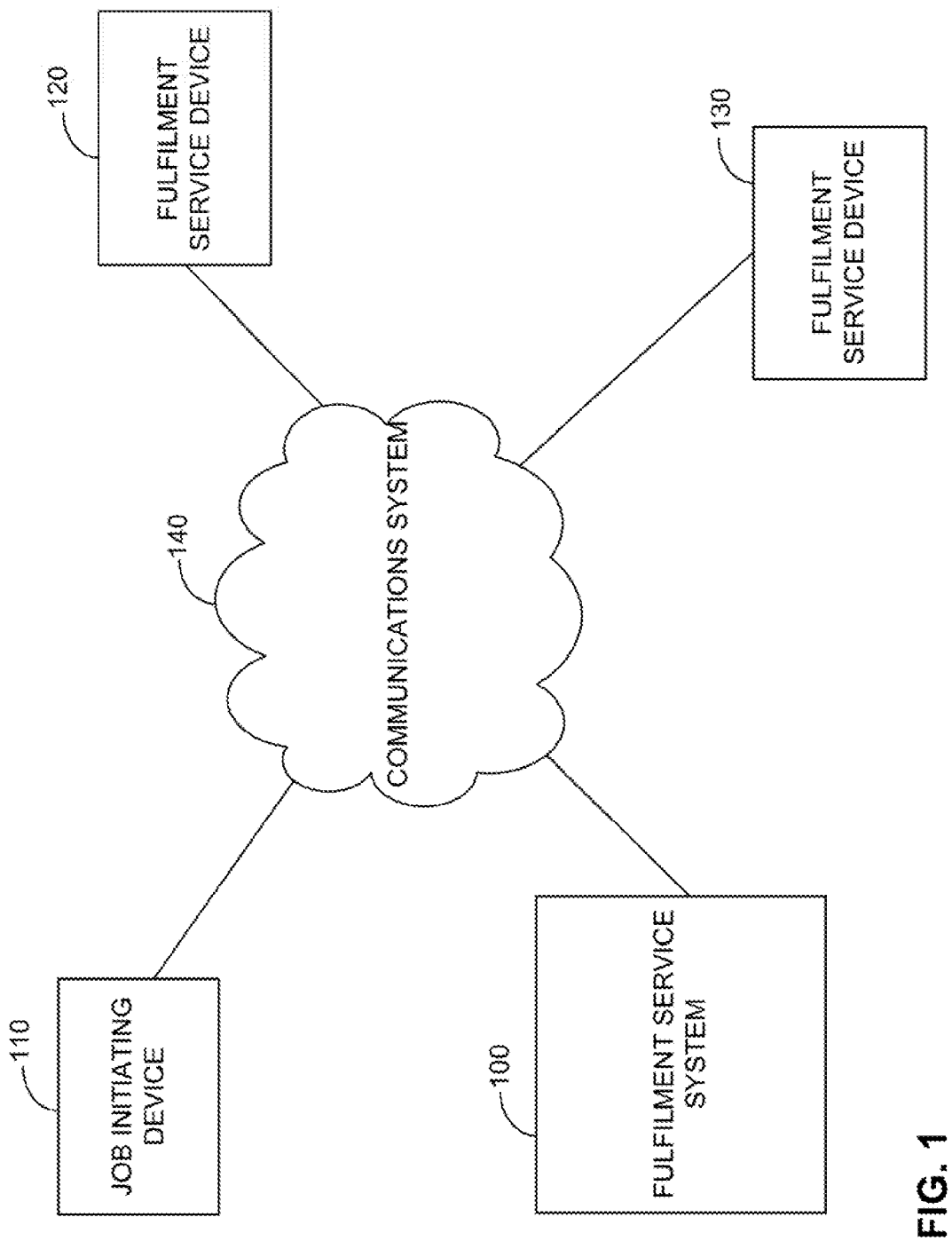
FIG. 1 is an illustration of an example environment including a fulfilment service system, which may make use of a controller of the present disclosure.

FIG. 1 is an illustration of an example environment including a fulfilment service system, which may make use of a controller of the present disclosure.

Figure 2:
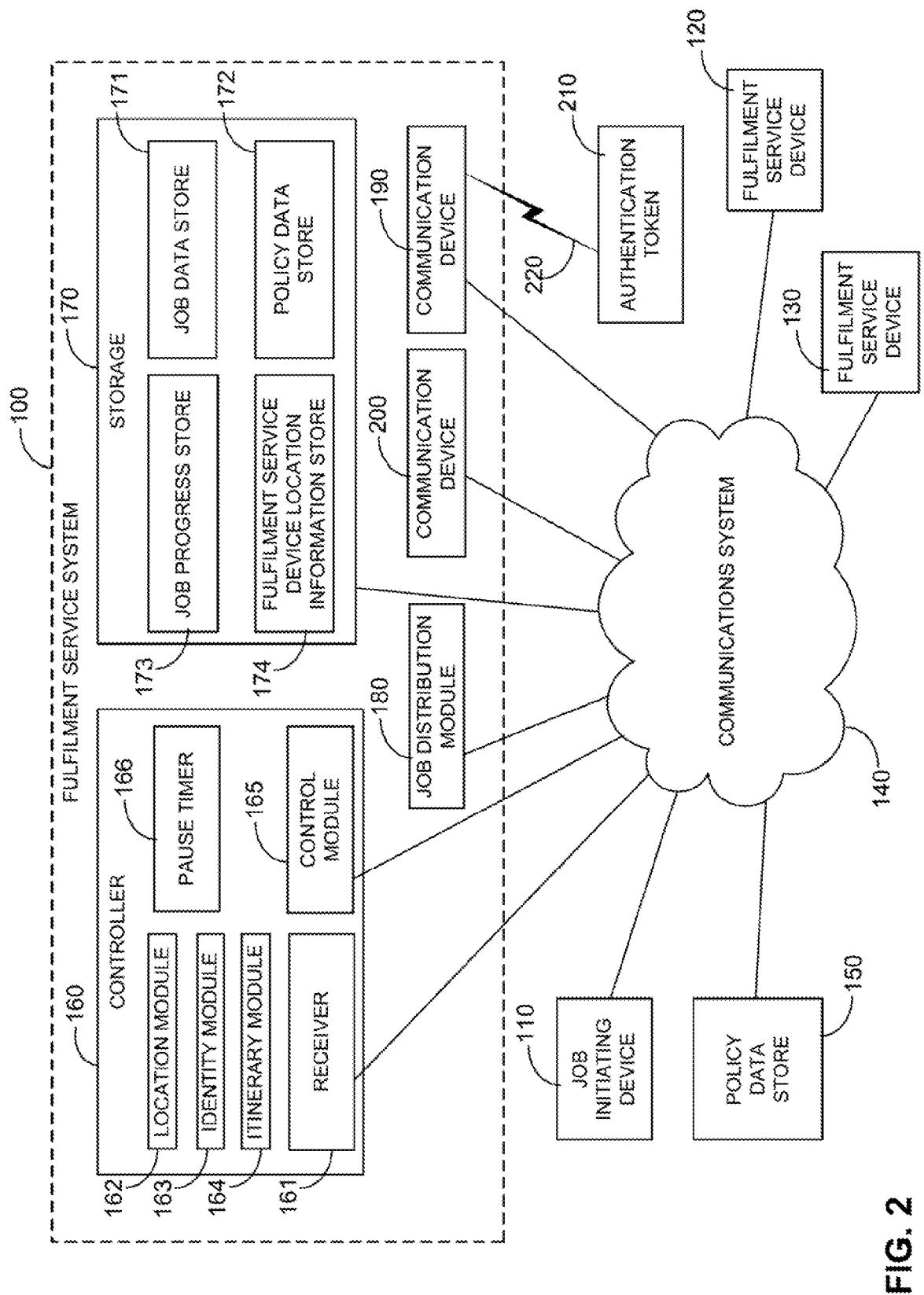
FIG. 2 is a more detailed illustration of the example environment of FIG. 1.
Figure 3:
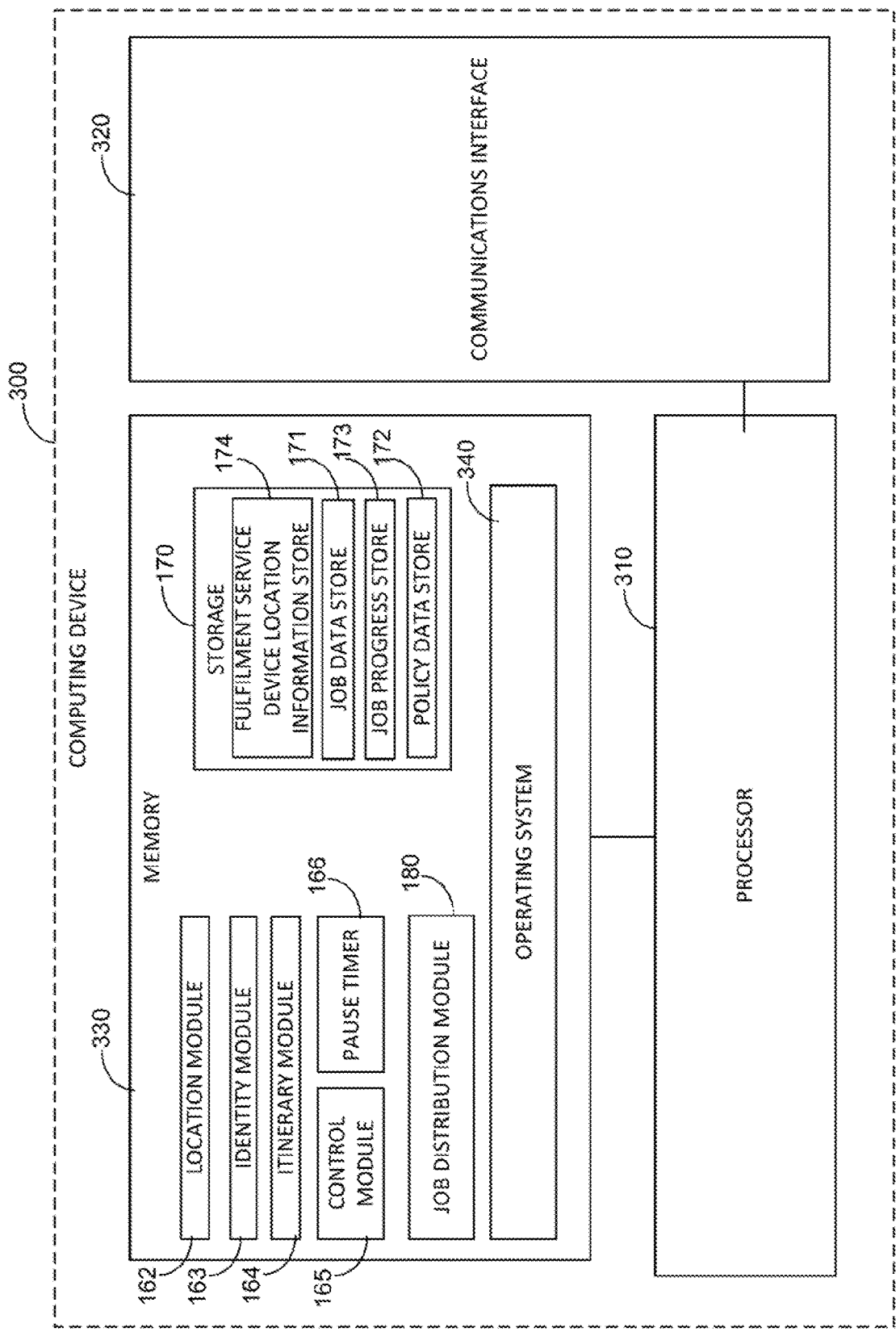
FIG. 3 is a schematic block diagram of an example computing device hosting a fulfilment service system, which may make use of a controller of the present disclosure.

Although various modules (i.e., combinations of hardware and machine readable instructions) are illustrated and discussed in relation to FIGS. 1 to 3 and other example implementations, other combinations or sub-combinations of modules can be included within other implementations. The modules illustrated in FIGS. 1 to 3 perform specific functionalities in the examples discussed herein. However, these and other functionalities can be accomplished at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

The environment illustrated in FIG. 1 includes fulfilment service system 100, job initiating device 110, fulfilment service devices 120 and 130, and communications system 140. Communications system 140 includes devices, services, or a combination thereof that define communications paths between fulfilment service system 100, job initiating device 110, and fulfilment service devices 120 and 130, and/or other devices or services. For example, communications system 140 can include at least one of a cable (e.g., twisted-pair cable, coaxial cable, or fiber optic cable), a wireless link (e.g., radio frequency link, optical link, or sonic link), or any other connectors or systems that transmit or support transmission of signals. Communications system 140 can include communications networks such as an intranet, the Internet, other telecommunications networks, or a combination thereof. Additionally, communications system 140 can include proxies, routers, switches, gateways, bridges, load balancers, and similar communications devices. Furthermore, the connections and communications paths illustrated in FIG. 1 are logical and do not necessarily reflect physical connections.

Fulfilment service devices 120 and 130 can communicate via communications system 140. For example, fulfilment service devices 120 and 130 can each include a communications interface such as a network interface card (e.g., an IEEE 802.11-compliant network interface card or a wired network interface card) via which fulfilment service devices 120 and 130 can communicate with fulfilment service system 100. In some implementations, at least one of the fulfilment service devices 120 and 130 communicate via a computing device operatively coupled to communications system 140. For example, a printer can be connected to a computing device (not shown) via a Universal Serial Bus (USB) connection, and that computing device can communicate via communications system 140. In such implementations, the computing device can function as a proxy to the communications system for the printer.

Additionally, fulfilment service devices 120 and 130 can receive jobs from fulfilment service system 100. A job may be communicated to a fulfilment service device 120 and 130 for completion responsive to a job-proceed instruction. A job-proceed instruction is a signal or command that instructs a job distribution module to forward a job to a specified fulfilment service device for completion.

Job initiating device 110 can be a computing device such as a desktop computer or a mobile computing device (e.g. a smartphone, a tablet, a notebook computer, or personal digital assistant).

Fulfilment service system 100 facilitates providing jobs to fulfilment service devices 120 and 130, and can initiate fulfilment of the jobs when a certain set of conditions are satisfied. For example, a user (or client) of fulfilment service system 100 can request that a job be fulfilled by instructing job initiating device 110, or another computing device, to provide a job initiation request to fulfilment service system 100. Fulfilment service system 100 then provides a job to a fulfilment service device (e.g., one of fulfilment service devices 120 and 130) based on the job initiation request and based upon certain conditions being satisfied.

A job initiation request is data that requests some action from fulfilment service system 100. For example, a job initiation request can include a document file identifying job data to be fulfilled and policy data defining policies that should be satisfied in order for fulfilment of the job to be initiated. The job initiation request can also include a fulfilment service device at which the job should be fulfilled. As another example, a job initiation request can comprise a print request identifying a print job, who is authorised to initiate printing of the print job at a printer (i.e. a fulfilment service device), a printer at which the print job should be printed, a duration of the print job, and a schedule of each of the authorised initiators. A print job is data that includes or identifies content to be printed. For example, a print job can include PostScript (PS) or Portable Document Format (PDF) data representing content to be printed at a printer. In other implementations, a print job can include data representing content to be printed that is formatted in other public or proprietary formats.

More specifically, fulfilment service system 100 can receive job initiation requests via a variety of methodologies. For example, fulfilment service system 100 can receive job initiation requests via Short Message Service (SMS), electronic mail, a messaging protocol such as the Extensible Messaging and Presence Protocol (XMPP), the Hypertext Transport Protocol (HTTP), or other methodologies.

The fulfilment service system 100 described above in relation to FIG. 1 will now be described in more detail with reference to FIG. 2, which is a more detailed illustration of the example environment of FIG. 1.

In addition to the fulfilment service system 100, job initiating device 110, fulfilment service devices 120 and 130, and communications system 140, the environment also includes a policy data store 150.

Policy data store 150 can store data defining policies that should be satisfied in order for the job-proceed instruction to be issued. Policy data is retrieved from the policy data store 150 by the job initiating device 110 responsive to receipt, at the job initiating device 110, of instructions to begin fulfilment of a job. The policy data is included in the job initiation request that the job initiating device 120 sends to the fulfilment service system 100.

The fulfilment service system 100 comprises a controller 160, storage 170, a job distribution module 180, and communication devices 190 and 200.

Communication devices 190 and 200 are paired with the fulfilment service devices 120 and 130. That is, communication device 190 is paired with fulfilment service device 120 and communication device 200 is paired with fulfilment service device 130. The communication devices 190 and 200 operate to establish a communications link with an authentication token 210. Thus, when the authentication token 210 is within communications range of one of the communications devices 190 or 200, a communication link is established and data can be read from the authentication token 210.

In the illustrated example, a communications link 220 is established between communication device 190 and the authentication token 210.

As described above, communications system 140 includes devices, services, or a combination thereof that define communications paths between fulfilment service system 100, job initiating device 110, and fulfilment service devices 120 and 130, and/or other devices or services. Additionally, the communications system 140 may define a communication path between the policy data store 150 and the above systems and devices. Further, the communications system may define a communications path between the elements of the fulfilment service system 100 themselves, i.e. controller 160, storage 170, job distribution module 180, and communication devices 190 and 200.

Controller 160 comprises a receiver 161, a location module 162, an identity module 163, an itinerary module 164 and a control module 165. The controller can also include a pause timer 166.

Storage 170 comprises a data storage area, e.g. a memory, which includes regions forming a job data store 171, a policy data store 172, a job progress store 173 and a fulfilment service device location information store 174.

In general outline, the receiver 161 operates to receive a document file defined in a job initiation request. The location module 162, identity module 163 and itinerary module 164 operate to determine if location information, identity information and itinerary information satisfy respective aspects of the policy data as defined in the document file (i.e. a location policy, identity policy and itinerary policy). The control module 165 operates to issue job control instructions based on outcomes of the determinations performed by the location module 162, identity module 163 and itinerary module 164.

Pause timer 166 can operate to serve as a measure of a period of non-satisfaction of aspects of the policy data following pausing of a job. In an example implementation, if a time-count (T), as measured by the pause timer 166, is equal to, or exceeds a pre-defined time-count ($T_P$), the controller 160 can cause the job to be cancelled.

Job data and policy data received in a document file in an incoming job initiation request from the job initiating device 110 are directed, by job distribution module 180, to job data store 171 and policy data store 172 respectively for storage therein.

Job progress store 173 can store location data representing a point at which a job is paused or cancelled. Such location data can be retrieved to allow the paused or cancelled job to resume from the point at which the job was paused or cancelled.

Fulfilment service device location information store 174 can comprise a database or other repository of location information for fulfilment service devices.

Job distribution module 180, in addition to receiving the job data from the receiver 161 of controller 160 and forwarding the job data to the job data store 171 for storage therein, can also receive policy data from the receiver 161 and forward the policy data to the policy data store 172. The job distribution module 180 can further operate to retrieve the job data from the job data store 171 and forward the job data to a fulfilment service device 120 or 130 in response to receiving a job-proceed instruction from the control module 165 of the controller 160.

Job distribution module 180 can provide the job to a fulfilment service device 120 or 130 identified in the job initiation request using a suitable messaging protocol. Location module 162 receives location information from a communication device 190 or 200 that has established a communications link with the authentication token 210. That is, the location information from the communication device is representative of location information associated with the authentication token 210. The location module 162 compares that location information with a location policy stored in the policy data store 172. In particular, the location module 162 compares location information specified in the location policy (i.e. location information associated with (e.g., representing the location of) the fulfilment service device specified to conduct fulfilment of the job). Location information can include latitude/longitude coordinates, identifiers of reference points or locations, or other information that describes a location. Location module 162 can access location information associated with the fulfilment service device at fulfilment service device location information store 174.

If the location information from a communication device and the location information for the fulfilment service device indicate that the location of the communication device that the authentication token is in communication with and the location of the fulfilment service device are within conditions specified in the location policy, the location policy is satisfied.

The identity module 163 and itinerary module 164 operate in a similar manner to determine if an identity policy and itinerary policy respectively are satisfied. Further detail of the operation of these modules is described in relation to FIGS. 4a, 4b, 5a, 5b and 6.

Fulfilment service system 100 can be implemented using a variety of topologies or architectures. FIG. 3 illustrates an example implementation and shows a schematic block diagram of an example computing device hosting a fulfilment service system, which may make use of a controller of the present disclosure. Computing device 300 includes processor 310, communications interface 320, and memory 330. Processor 310 is any combination of hardware and machine readable instructions that executes or interprets instructions, codes, or signals. For example, processor 310 can be a microprocessor, an application-specific integrated circuit (ASIC), a distributed processor such as a duster or network of processors or computing devices, a multi-core or multi-processor processor, or a virtual machine.

Communications interface 320 is a module via which processor 310 can communicate with (i.e. transmit data to and/or receive data from) other processors or computing devices (e.g., job initiating device 110, authentication token 210 or fulfilment service devices 120 and 130. For example, communications interface 320 can include a network interface card and a communications protocol stack hosted at processor 310 (e.g., instructions or code stored at memory 330 and executed or interpreted at processor 310 to implement a network protocol). As specific examples, communications interface 320 can be a wired interface, a wireless interface, an Ethernet interface, a Fiber Channel interface, an InfiniBand interface, an IEEE 802.11 interface, or some other communications interface via which processor 310 can exchange signals or symbols representing data to communicate with other processors or computing devices.

Memory 330 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 330 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 330 can be integrated with processor 310, separate from processor 310, or external to computing device 300.

Memory 330 includes instructions or codes that when executed at processor 310 implement operating system 340, location module 162, identity module 163, itinerary module 164, control module 165, pause timer 166 and job distribution module 180. Regions of the memory 330 can store date in the fulfilment service device location information store 174, job data store 171, job progress store 173 and policy data store 172. Location module 162, identity module 163, itinerary module 164, control module 165, pause timer 166 and job distribution module 180 collectively implement a fulfilment service system. In other words, operating system 340, location module 162, identity module 163, itinerary module 164, control module 165, pause timer 166 and job distribution module 180 are each instructions or code that—when executed at processor 310—cause processor 310 to perform operations that implement an operating system and a fulfilment service system. Said differently, operating system 340, location module 162, identity module 163, itinerary module 164, control module 165, pause timer 166 and job distribution module 180 are hosted at computing device 300 (or at processor 310).

In some implementations, computing device 300 can be a virtualized computing device. For example, computing device 300 can be hosted as a virtual machine at a computing server. Moreover, in some implementations, computing device 300 can be a virtualized computing appliance, and operating system 340 is a minimal or just-enough operating system to support (e.g., provide services such as a communications protocol stack and access to components of computing device 300 such as communications interface 320) a fulfilment service system including location module 162, identity module 163, itinerary module 164, control module 165, pause timer 166 and job distribution module 180.

A fulfilment service system (e.g., a fulfilment service including location module 162, identity module 163, itinerary module 164, control module 165, pause timer 166 and job distribution module 180) can be accessed or installed at computing device 300 from a variety of memories or processor-readable media. For example, computing device 300 can access a remote processor-readable medium via communications interface 320 and the fulfilment service system at that processor-readable medium. As a specific example, computing device 300 can be a client that accesses operating system 340 and the fulfilment service system during a boot sequence.

As another example, computing device 300 can include (not illustrated in FIG. 3) a processor-readable medium access device (e.g., CD, DVD, SD, MMC, or a CF drive or reader) and the fulfilment service system at a processor-readable medium via that processor-readable medium access device. As a more specific example, the processor-readable medium access device can be a DVD drive at which a DVD including an installation package for the fulfilment service system is accessible. The installation package can be executed or interpreted at processor 310 to install the fulfilment service system at computing device 300 (e.g., at memory 330). Computing device 300 can then host or execute the fulfilment service.

In some implementations, a print service system can be accessed at or installed from multiple sources, locations, or resources. For example, some components or modules of the print service system can be installed via a communications link, and other components or modules of the print service can be installed from a DVD.

A description of a fulfilment operation implemented by a fulfilment service system, which incorporates a controller, follows with reference to FIGS. 4A, 4B, 5A and 5B.

Figure 4A:
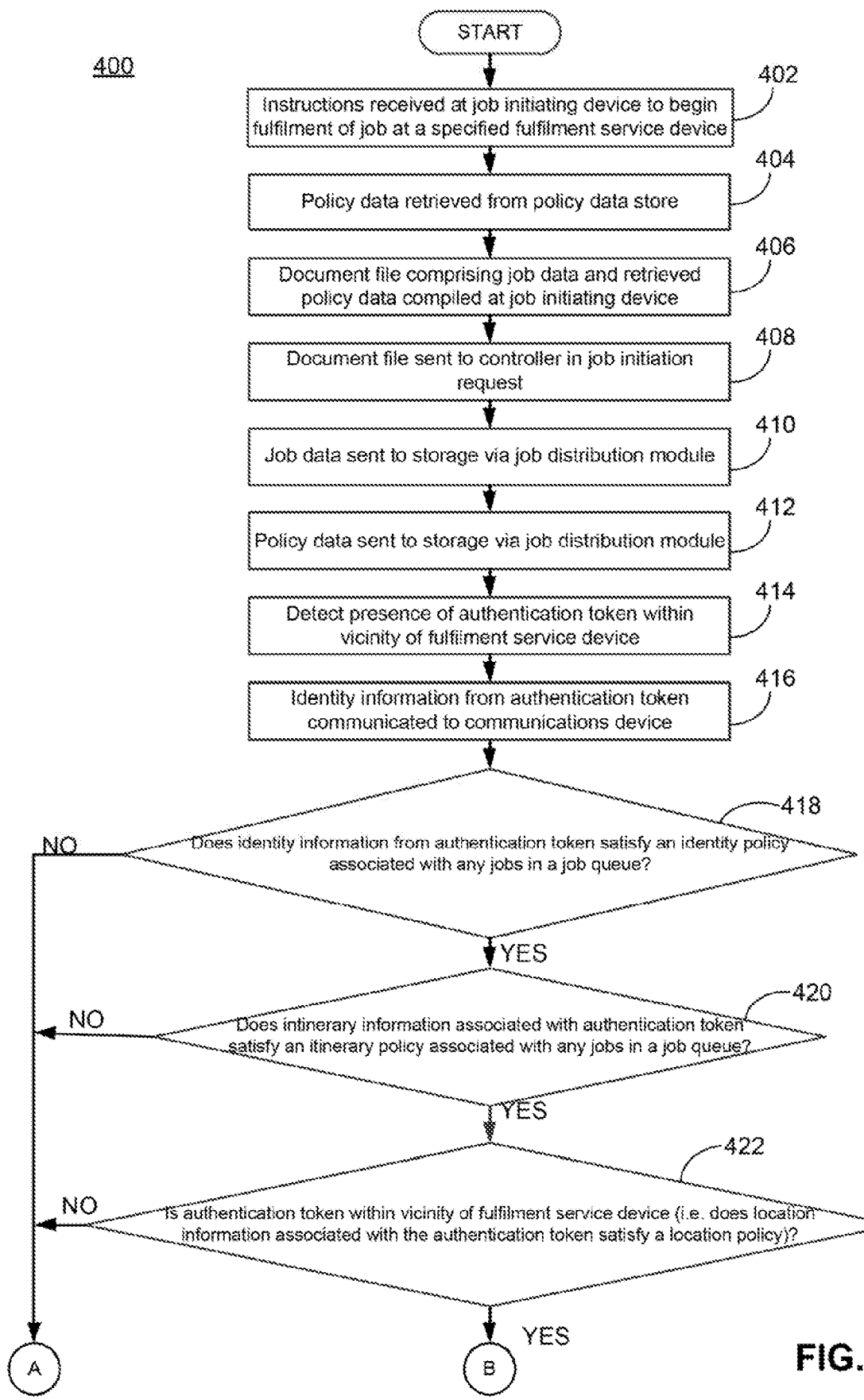
FIGS. 4A and 4B illustrate an example flowchart of operations that may be implemented in a job-fulfilment process implementable by a controller of the present disclosure.
Figure 4B:
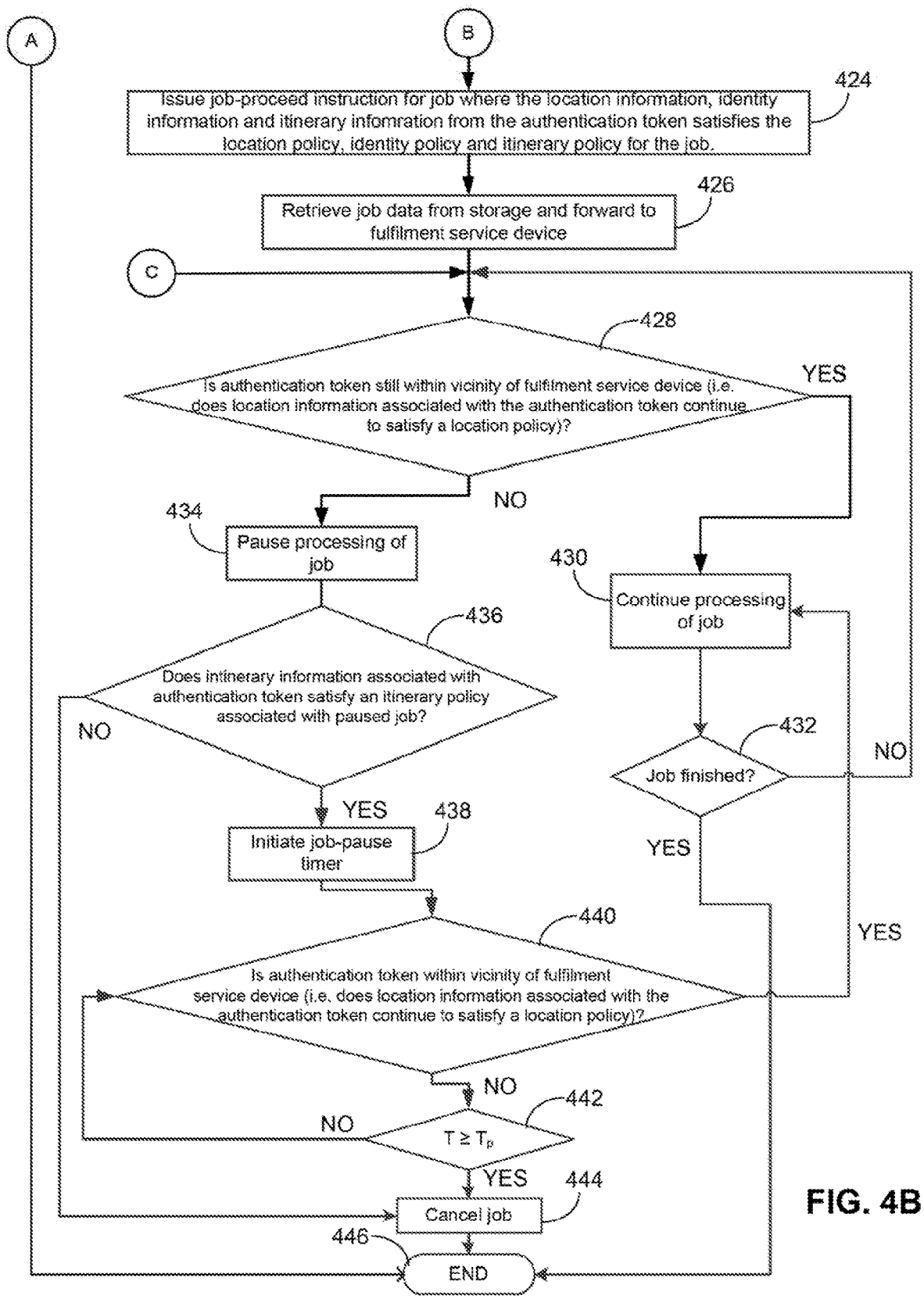
Figure 5A:
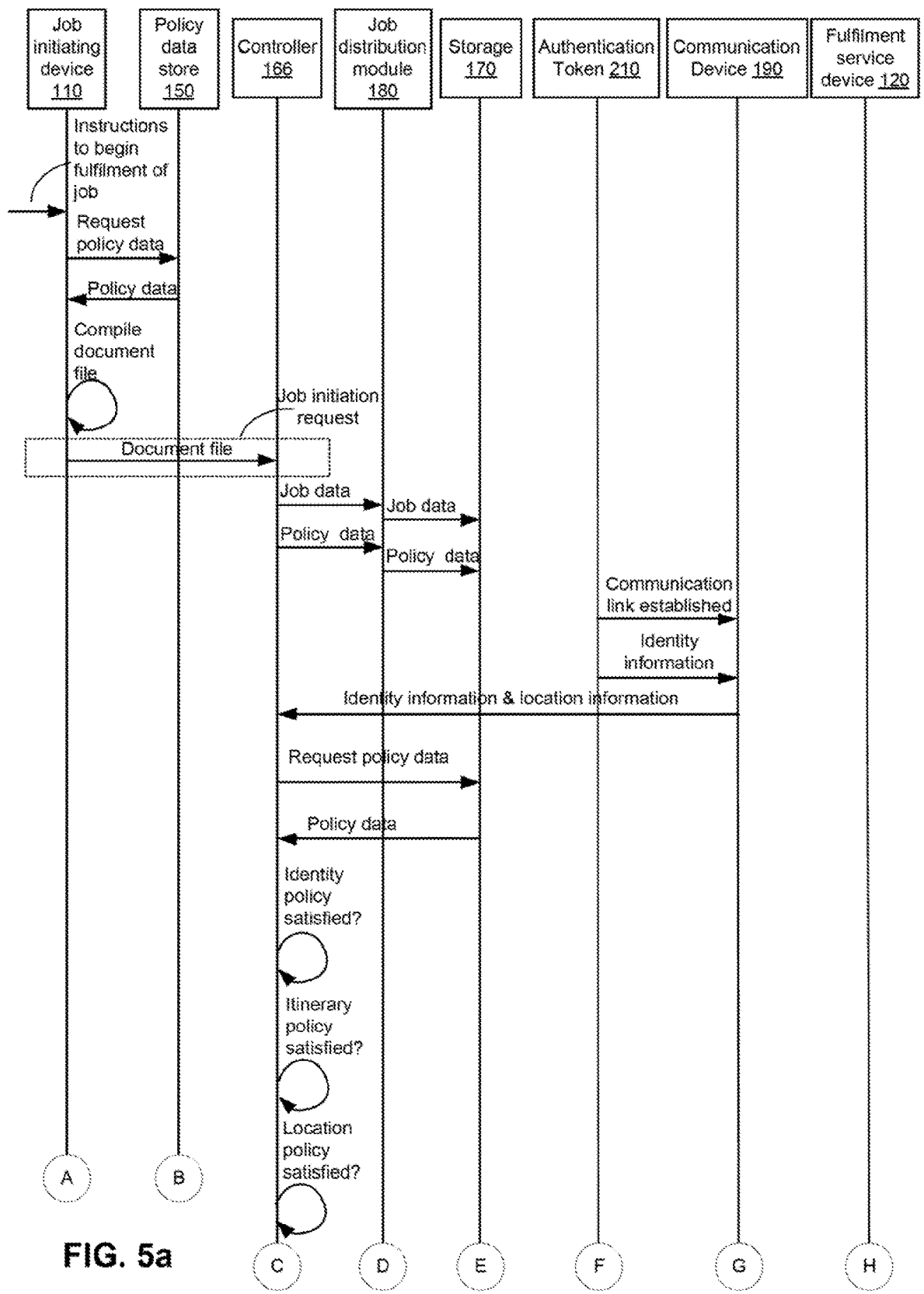
FIGS. 5A and 5B illustrate an example data flow within an environment including a fulfilment service system, which may make use of a controller of the present disclosure.
Figure 5B:
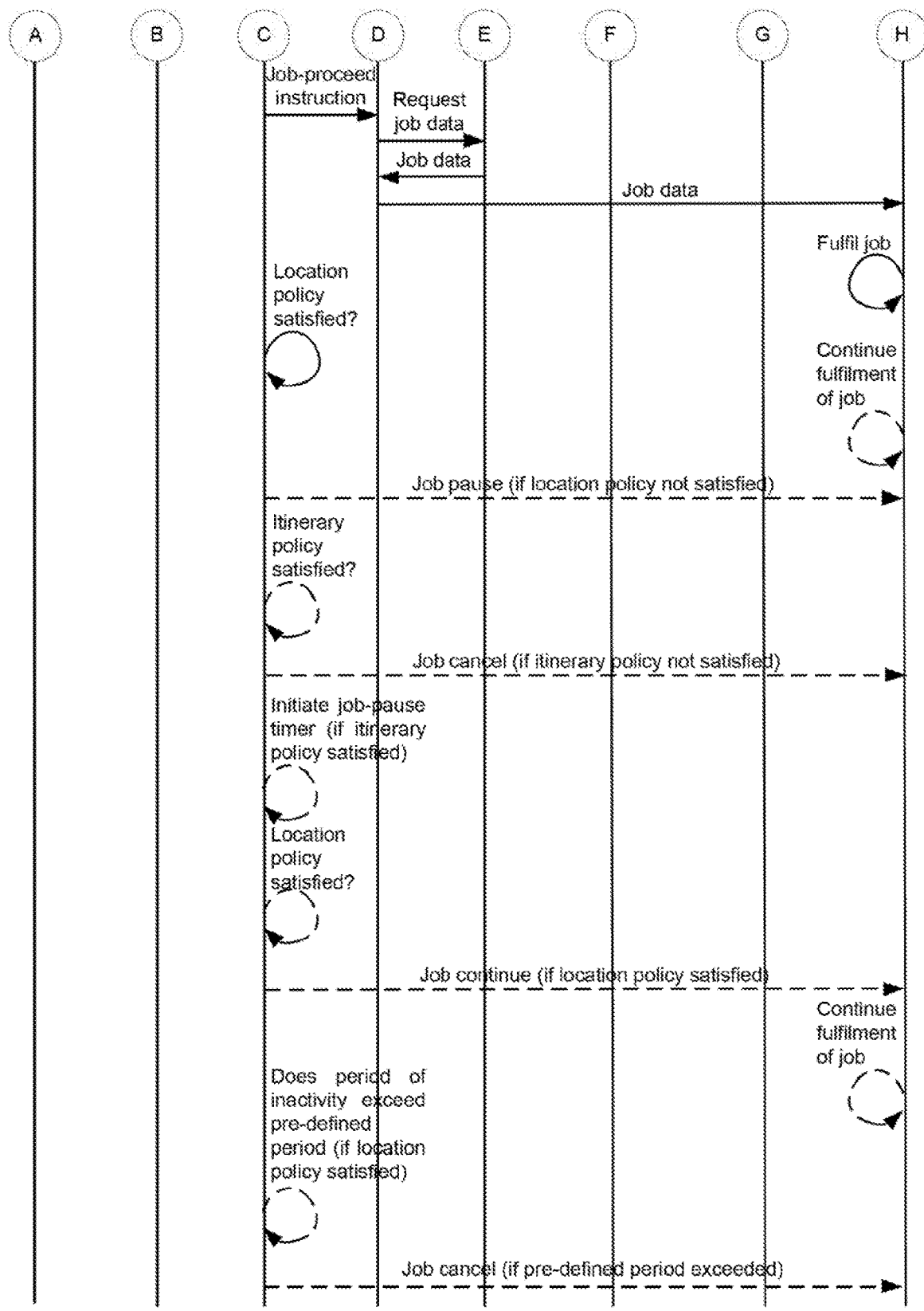

FIGS. 4A and 4B illustrate an example flowchart of operations that may be implemented in a job-fulfilment process 400 implementable by a controller of the present disclosure and FIGS. 5A and 5B illustrate an example data flow within an environment including a fulfilment service system, which includes the controller.

The process 400 will be described for a situation in which a communications link is established between the authentication token 210 and communications device 190.

A user wishing for a job to be fulfilled at a specified fulfilment service device inputs instructions (block 402) to begin fulfilment of the job at a job initiating device 110. The instructions include a specification of the fulfilment service device to fulfil the job (i.e., in the present example, fulfilment service device 120).

Responsive to receipt of the instructions, the job initiating device 110 sends a request for policy data (block 404) to policy data store 150. Policy data is located and communicated to the job initiating device 110, which compiles a document file comprising job data (i.e., data for use by the fulfilment service device 120 to fulfil the job) and retrieved policy data (block 406). The document file is sent by the job initiating device 110 to the controller 166 in a job initiation request (block 408).

When the controller 166 receives the job initiation request, the job data of the document file is sent to storage 170 via job distribution module 180 (block 410). In particular, the job data is sent to job data store 171 of storage 170. Similarly, policy data of the document file is sent to storage 170 via job distribution module 180 (block 412). In particular, the policy data is sent to policy data store 172 of storage 170.

The user, bearing the authentication token 210, approaches fulfilment service device 120 to allow the job processing at the fulfilment service device 120. As the user approaches the fulfilment service device 120, the authentication token 210 enters communication range of communications device 190. As stated previously, communication device 190 is paired with fulfilment service device 120. When the authentication token 210 enters communication range of communications device 190 a communication link between authentication token 210 and communications device 190 is established and the communications device 190 detects presence of the authentication token 210 within the vicinity of the fulfilment service device 120 (block 414). Identity information stored on the authentication token 210 is communicated to the communications device 190 (block 416). Responsive to receipt of the identity information, the communications device 190 forwards the identity information to controller 166. Also, location information of the communications device 190 is communicated to the controller 166. Since the communications device 190 is in communication with the authentication token 210, the location information of the communications device 190 is indicative of the location of the authentication token 210 (i.e., the location information is associated with the authentication token 210).

The controller 166 requests policy data from storage 170 and, responsive to receipt, determines if identity information from the authentication token 210 satisfies an identity policy associated with any jobs in a job queue (block 418). If not, the process 400 terminates (block 446). However, if the controller 166 (particularly, identity module 163) determines that an identity policy is satisfied (i.e. that the identity information of the authentication token 210 matches identity information in the policy data—indicative of the user being a user authorised to initiate fulfilment of the job, or of the user being one of a number of users authorised to initiate fulfilment of the job), then controller 166 proceeds to determine if itinerary information associated with the authentication token 210 satisfies an itinerary policy associated with a job in the job queue (block 420). Said another way, the identity information for the job is defined in the policy data as part of an identity policy (e.g. a list of the users who are authorised to initiate fulfilment of the job). If the identity information associated with the authentication token matches identity information in the policy data (determined by comparison of the identity information for the authentication token with that in the policy data) then the identity policy is deemed to be satisfied by the identity module.

If the controller determines that the itinerary policy is not satisfied, the process 400 terminates (block 446).

Itinerary module of controller 166 compares itinerary information associated with the authentication token with itinerary information for the job. The itinerary information for the job is defined in the policy data as part of the itinerary policy (e.g. data indicative of how long it will take to complete fulfilment of the job). If the itinerary information associated with the authentication token does not conflict with itinerary information in the policy data (e.g. determined by a comparison between a time of the user's next appointment and a current time to determine if there is sufficient time to complete the job before the user's next appointment) then the itinerary policy is deemed to be satisfied by the itinerary module.

If controller 166 (particularly, itinerary module 164) determines that the itinerary policy is satisfied, then controller 166 proceeds to determine if a location policy is satisfied (block 422).

If the controller determines that the location policy is not satisfied, the process 400 terminates (block 446).

Location module of controller 166 compares the location information associated with the authentication token 210 (i.e. location information of the communications device 190 with which the authentication token is currently communicating) with location information of a communications device associated with a fulfilment service device that has been selected for carrying out the job. The location information associated with the communications device paired to the fulfilment service device that has been selected for carrying out the job is defined in the policy data as part of the location policy. If the location information associated with the authentication token 210 is indicative of the authentication token 210 being in proximity to the fulfilment service device 190 (determined by comparison of the location information of the communications device 190 with which the authentication token is communicating and that of the communications device paired to the specified fulfilment service device) then the location policy is deemed to be satisfied by the location module.

If controller 166 (particularly, itinerary module 162) determines that the location policy is satisfied (i.e. all three policies are satisfied), then controller 166 proceeds to issue a job proceed instruction for the job (block 424). Responsive to issue of the job-proceed instruction by controller 166, job distribution module 180 retrieves job data from job data store of storage 170 and forwards the job data to the fulfilment service device 120 for fulfilment of the job by the fulfilment service device 120 (block 426).

During fulfilment of the job by the fulfilment service device 120, controller 166 determines if the location policy remains satisfied (block 428). This is to ensure that the authentication token 210 carried by the user remains within the vicinity of the communications device 190 compared to the fulfilment service device 120 (i.e. to ensure that the user is attendant at, near, or in the vicinity of, the fulfilment service device 120). For example, if the user moves away from the fulfilment service device 120 such that the authentication token 210 is no longer willing communications range of communications device 190, then the location policy will no longer be satisfied. However, if the user remains within the vicinity of the fulfilment service device 120, then the location policy remains satisfied.

If controller 166 determines that location policy remains satisfied, then the fulfilment service device 120 continues processing the job (block 430).

Controller 166 monitors progress of the job to determine if the job has finished or not (block 432). If a determination is made that the job is not finished, then the process returns to block 428 and the controller 166 determines if the location policy is still satisfied. However, if a determination is made that the job has finished, then the process terminates (block 446).

If, responsive to a determination by controller 166 that the location policy is not satisfied (block 428), controller 166 issues a job pause instruction to the fulfilment service device 120, which causes processing of the job (block 434). Controller 166 compares itinerary information associated with the authentication token with itinerary information for the paused job (block 436). It may be the case that, for example, the user has left the facility of the fulfilment service device 120 to attend a meeting, or may even have left the building. The itinerary information of the authentication token 210 will be indicative of this and so, if the itinerary policy is no longer satisfied, the controller 166 issues a job cancel instruction to the fulfilment service device 120, which cancels the job (block 444). However, if the itinerary policy remains satisfied, the controller 166 initiates a job-pause timer (block 438).

While the job is paused, controller 166 determines if the location policy has changed from a non-satisfied state to a satisfied state (block 440). For example, the user may have returned to the vicinity of the fulfilment service device 120. If the controller 166 determines that the location policy is satisfied, then a job-continue instruction is issued by the controller 166 to the fulfilment service device 120, which continues processing the job (block 430). However, if the controller 166 determines that the location policy remains non-satisfied, then controller 166 determines if a count of the pause timer has reached a pre-defined pause limit (block 442). If the count of the pause timer is indicative of the pre-defined pause limit being reached, or surpassed, then the controller 166 issues a job-cancel instruction to the fulfilment service device 120 which cancels the job (block 444).

However, if the count of the pause timer is indicative of the pre-defined pause limit not yet having been reached, then the controller 166 determines if the location policy remains non-satisfied (block 440) and the job remains in a paused-state.

In FIG. 5B, the data flows relating to processes implemented by the controller 166 that involve determinations made by the controller after a job-proceed instruction has been issued are illustrated using dashed lines.

The controller 166 also operates to determine if a pause command is received from a job initiating device 110. If such a pause command is received, the controller operates to issue a job-pause instruction to the fulfilment service device (and the process moves to block 434 of FIG. 4B and continues therefrom). Thus, a user wishing to pause the processing of a job can enter an instruction at the job initiating device 110, which causes the pause command to be issued to controller 166.

When the controller 166 issues a job-pause instruction (responsive to either a determination that one of the three policies is not satisfied, or to receipt of a pause command), the controller 166 (particularly the control module 165) sends, to the job progress store 173, location data indicative of a location in the job where progress was paused. This location data may be used at a later time when an instruction to resume a paused or cancelled job is received. The location data may be used by the fulfilment service device 120 to resume fulfilment of the job from the point at which the job was paused.

Figure 6:
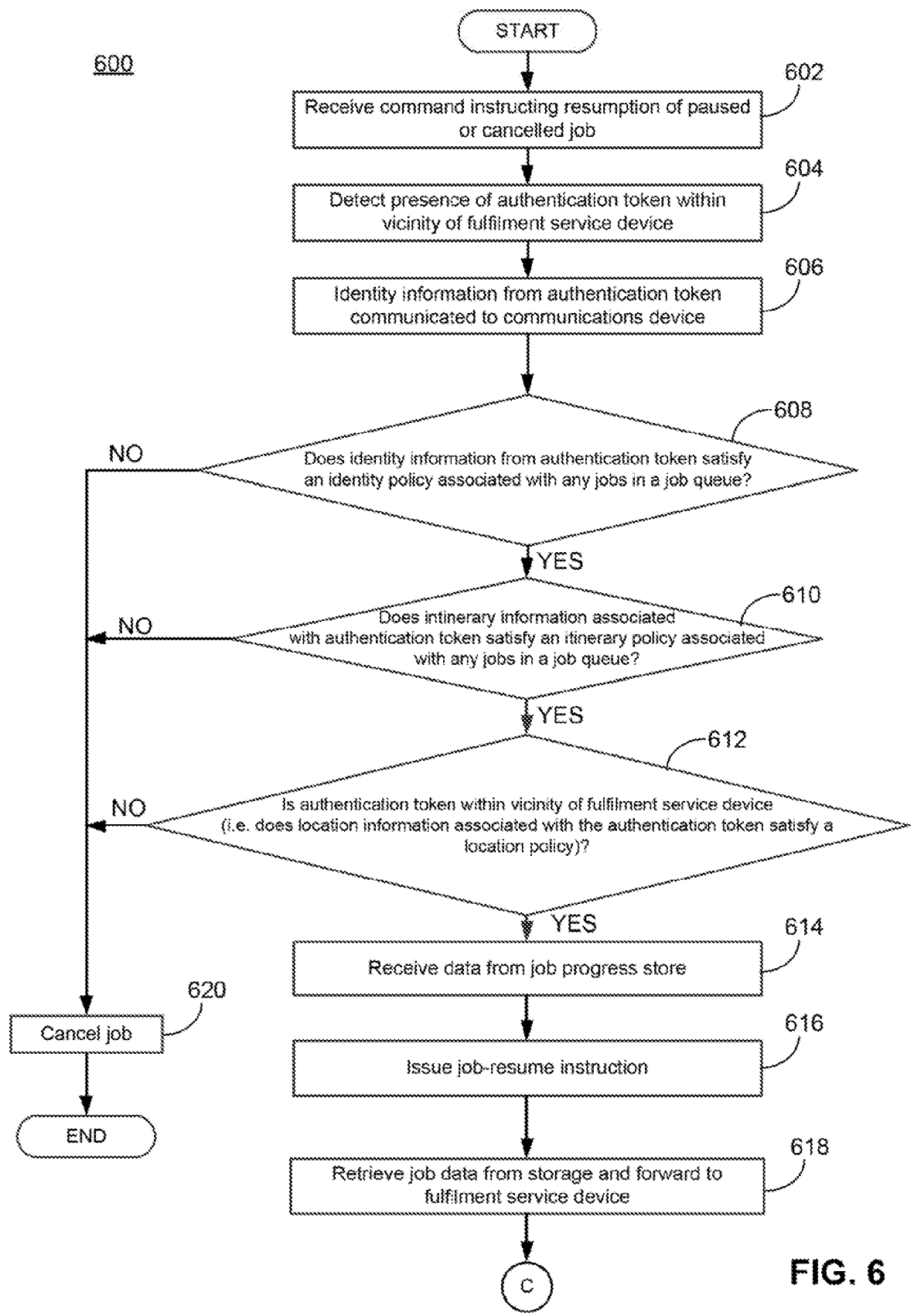
FIG. 6 illustrates another example flowchart of operations that may be implemented in a job-fulfilment process implementable by a controller of the present disclosure.

FIG. 6 illustrates another example flowchart of operations that may be implemented in a job-fulfilment process 600 implementable by a controller 166 of the present disclosure for resuming fulfilment of a job that has been paused or cancelled.

Responsive to receipt of an instruction to resume a paused or cancelled job (block 602), the job initiating device 110 retrieves policy data from policy data store 150, compiles a document file and forwards the document file in a job resumption request to controller 166.

When the controller 166 receives the job resumption request, the job data of the document file is sent to storage 170 via job distribution module 180. In particular, the job data is sent to job data store 171 of storage 170. Similarly, policy data of the document file is sent to storage 170 via job distribution module 180. In particular, the policy data is sent to policy data store 172 of storage 170.

When the authentication token 210 enters communication range of communications device 190 a communication link between authentication token 210 and communications device 190 is established and the communications device 190 detects presence of the authentication token 210 within the vicinity of the fulfilment service device 120 (block 604).

Identity information stored on the authentication token 210 is communicated to the communications device 190 (block 606). Responsive to receipt of the identity information, the communications device 190 forwards the identity information to controller 166. Also, location information of the communications device 190 is communicated to the controller 166. Since the communications device 190 is in communication with the authentication token 210, the location information of the communications device 190 is indicative of the location of the authentication token 210 (i.e., the location information is associated with the authentication token 210).

The controller 166 requests policy data from storage 170 and, responsive to receipt, determines if identity information from the authentication token 210 satisfies an identity policy associated with any jobs in a job queue (block 608). If not, the process 600 terminates (block 620). However, if the controller 166 (particularly, identity module 163) determines that an identity policy is satisfied (i.e. that the identity information of the authentication token 210 matches identity information in the policy data—indicative of the user being a user authorised to initiate fulfilment of the job, or of the user being one of a number of users authorised to initiate fulfilment of the job), then controller 166 proceeds to determine if itinerary information associated with the authentication token 210 satisfies an itinerary policy associated with a job in the job queue (block 610). Said another way, the identity information for the job is defined in the policy data as part of an identity policy (e.g. a list of the users who are authorised to initiate fulfilment of the job). If the identity information associated with the authentication token matches identity information in the policy data (determined by comparison of the identity information for the authentication token with that in the policy data) then the identity policy is deemed to be satisfied by the identity module.

If the controller determines that the itinerary policy is not satisfied, the process 600 terminates (block 620).

Itinerary module of controller 166 compares itinerary information associated with the authentication token with itinerary information for the job. The itinerary information for the job is defined in the policy data as part of the itinerary policy (e.g. data indicative of how long it will take to complete fulfilment of the job). If the itinerary information associated with the authentication token does not conflict with itinerary information in the policy data (e.g. determined by a comparison between a time of the user's next appointment and a current time to determine if there is sufficient time to complete the job before the user's next appointment) then the itinerary policy is deemed to be satisfied by the itinerary module.

If controller 166 (particularly, itinerary module 164) determines that the itinerary policy is satisfied, then controller 166 proceeds to determine if a location policy is satisfied (block 612).

If the controller determines that the location policy is not satisfied, the process 600 terminates (block 620).

Location module of controller 166 compares the location information associated with the authentication token 210 (i.e. location information of the communications device 190 with which the authentication token is currently communicating) with location information of a communications device associated with a fulfilment service device that has been selected for carrying out the job. The location information associated with the communications device paired to the fulfilment service device that has been selected for carrying out the job is defined in the policy data as part of the location policy. If the location information associated with the authentication token 210 is indicative of the authentication token 210 being in proximity to the fulfilment service device 190 (determined by comparison of the location information of the communications device 190 with which the authentication token is communicating and that of the communications device paired to the specified fulfilment service device) then the location policy is deemed to be satisfied by the location module.

If controller 166 (particularly, itinerary module 162) determines that the location policy is satisfied (i.e. all three policies are satisfied), then controller 166 proceeds to request location data for the job from the job progress store 173 (block 614). Upon receipt of the location data for the job from the job progress store 173, the controller issues a job-resume instruction for the job (block 616). The job-resume instruction includes location data for the job (i.e. data identifying where in the job processing was paused). Responsive to issue of the job-resume instruction by controller 166, job distribution module 180 retrieves job data from job data store of storage 170 and forwards the job data to the fulfilment service device 120 for fulfilment of the job by the fulfilment service device 120 (block 618). The process then continues in the manner described above from block 428 (as shown in FIG. 4B).

In an example implementation of the present disclosure, location information from two or more communication devices are compared to location information for a fulfilment service device specified in a job initiation request. Location module 162 applies a proximity rule to the location information from the communication devices and the location information for the fulfilment service device. Said differently, location module 162 determines whether the location information from the communication devices and the location information for the printer satisfy a proximity rule. That is, a proximity rule may be satisfied if a communication link is established between one or other of the communication devices and an authentication token, or if a communication link is established between the both communication devices and the authentication token The proximity rule defines a condition between locations. For example, the proximity rule may define a condition based on the proximity of two locations. If the two locations are within that proximity, the condition (and, therefore, the proximity rule) is satisfied. As specific examples, the proximity rule can define a condition of 4 meters, 2 meters, 1 meters, or some other condition specified. If the location information from a communication device and the location information for the fulfilment service device indicate that the location of the communication device that the authentication token is in communication with and the location of the fulfilment service device are within the proximity defined by the proximity rule, the proximity rule is satisfied.

The present disclosure may allow a job that is to be fulfilled to be initiated and to be continued to be fulfilled if an authorised user is within proximity of the fulfilment service device and if the user intends for the job to continue. To do this, the controller of the present disclosure can continuously establish a combination of the user's identity, relative location, and intention to print. A set of policy-based actions are then taken when at least one these factors changes. For example, a job can be temporarily paused if a user walks away from the fulfilment service device by a specified distance. Moreover, the job can be altogether cancelled if the user does not return to the fulfilment service device within a specified time frame. This may ensure that users are encouraged to be present whilst a job is being fulfilled.

In an example implementation of the present disclosure policies may be employed to take into account the nature of the certain types of jobs to be fulfilled as there may be scenarios where jobs may be very long (e.g. a print job where the job to be printed comprises 600 pages) and take a lot of time to produce. Hence in these scenarios it may not be appropriate to force users to be present at the fulfilment service device.

The controller of the present disclosure may also provide an implementation that allows a user to pause a job (by entering a pause command), The user may remove the portion of the job that has been completed at that point and controller can operate to automatically cancel the remainder of the job once the user walks away by a specified distance and for a specified amount of time. A user can resume printing of the job at the same or another fulfilment service device from where they left off by instructing resumption of the paused job and the job being resumed when they authenticate to a fulfilment service device anew.

In an example implementation of the present disclosure, the controller may operate to issue a notification to notify a user of paused or cancelled jobs (such as, for example, by email and/or by information displayed on a job status menu of a fulfilment service device). This notification could be sent directly from the fulfilment service device (for example, in server-less pull-print example implementations) or from a server itself. In server-less pull-print solutions we the email address may be provided by the job meta-data or some element of an authenticating credential from the user. This may provide another layer of data leak protection to a fulfilment service.

In an example implementation of the present disclosure, a job to be fulfilled may be paused or cancelled in example scenarios such as the user no longer having permission to initiate a job to be fulfilled (e.g., credentials are revoked or have not been authenticated recently). Other reasons for cancelling the job may be that the user will not return, such as when they leave the office for the day.

In an example implementation of the present disclosure, policies based on whether a user should be encouraged to initiate fulfilment of a job another time or elsewhere can integrate with a schedule of the user so that before a job is started the user is notified that the job will not finished before e.g. their next meeting, or their planned departure from the office. In such an example implementation, the itinerary information may comprise data from a calendar of the user and/or other office information.

An example implementation of the present disclosure in a print environment will now be described. A user in a pull-print scenario may select a job for print at their initiating client device (i.e. a job initiating device). This results in the job being sent to a pull-print server for storage at the server (e.g. in an encrypted format). The release of the job is then linked to the key card of the user or a user mobile device that has previously registered with the pull-print service (i.e. the key card or registered mobile device are examples of an authentication token). The key card and mobile device are identified to belong to a particular user by the pull-print service. Jobs are released by a controller of the service when the user presents their authentication token to the printing device and the job may then start printing without further actions or notifications by the service beyond standard print notifications, e.g. the job has printed.

Continuous assessment and policy enforcement for print job initiation, pausing, cancellation and resumption may be based on location, identity, and intent policies being satisfied. The job could be sent via a pull-print server or directly from the client's mobile device. Although, an encrypted job is not a requirement for this solution, due to security concerns we describe the following workflows with an encrypted document and a user's mobile device, which of course can be reduced to unencrypted workflows.

To print a job the user selects the job on their job initiating device, or selects it on the printer.

The authentication token provides, to the printer which it is communicating with, a decryption key for the particular document sent to the printer. This key also has associated meta-data sent with it so that it can be tied to a specific print job. Once the controller has access to both the encrypted document and the decryption key it can initiate printing by decrypting the job and sending it to the print pipeline.

During this phase the authentication token and communication device associated with the printer (e.g. a reader device) may continuously communicate with each other to ensure that the authentication token is in close proximity to the printer. If the authentication token borne by the user is in proximity to the printer and has requested a job be printed, the job is sent to the print pipeline and printing starts. Throughout this time and until the job prints the controller monitors that the authentication token is in proximity to the printer. If the user moves a specified distance from the printer the controller operates to pause printing of the job. If the job is paused up to a specified time then it is cancelled by the controller and printing stops.

Before job cancellation occurs, messages may be provided to notify the user of the impending job cancellation. The message may prompt the user to return to the printer. A cancellation message may be communicated to the user device with reasons why the job has been cancelled. An message may also be communicated to the user to notify them that their job was cancelled but a number of pages were still printed at the printer when they had left the vicinity of the printer.

Jobs may be paused by the user using, for example, instructions entered via control buttons on the printer, or instructions entered via the job initiating device. In such a scenario, the user can enter the pause instructions and remove a partially printed document, and the controller will operate to cancel the remainder of the job. If a user does move away from the printer and the job gets cancelled, a message may be communicated to the user, and the pull-print server also may be informed that a job has been partially printed up to a certain point.

In an example implementation of the present disclosure, the controller may be implemented in a fulfilment service device, in a server, or implemented by a network of processors or computing devices.

In an example implementation of the present disclosure, a location policy forming part of the policy data in the document file may include instructions defining actions to be taken when the location policy is violated or not satisfied. The control module of the controller may issue a location policy violation instruction responsive to receipt of an indication that the location policy is not satisfied. Specific examples of location policy violation instructions that may be issued upon a determination of non-satisfaction of the location policy may comprise: a job-pause instruction; an instruction to effect transmission of a message from the controller to notify an authorised user (or authorised users) that a partially fulfilled job awaits at the fulfilment service device; an instruction to effect transmission of a message from the controller to notify an authorised user (or authorised users) that a completed job awaits at the fulfilment service device; and/or a job-cancel instruction. In addition to the description above, in which some of these types of location policy violation instructions are discussed already, the following paragraphs describe some of the location policy violation instructions further.

In an example implementation of the present disclosure, the control module of the controller may issue a job-pause instruction responsive to receipt of: an indication that at least one of the location policy, identity policy and itinerary policy is not satisfied; or a pause command received by the controller. Thus, in an example, during a fulfilment operation, i.e. while a job is in progress, the job may be paused when an authorisation token carried by a user moves away from the vicinity of the fulfilment service device. In such a scenario, the location policy is not satisfied and so the control module of the controller may issue the job-pause instruction. If the location policy remains unsatisfied for the pre-defined period (i.e. the time count (T), as measured by the pause timer, is equal to, or exceeds a pre-defined time count ($T_P$)) then the control module may issue the job-cancel instruction.

In an example implementation, the control module, upon determining that location policy is not satisfied during a fulfilment operation, may issue an instruction to effect transmission of a message from the controller to a message receiving device of the user (or messaging receiving devices of at least one of the users who are authorised to initiate fulfilment of the job, as identified in the identity policy). The message may be in the form of an SMS message or e-mail message, or other suitable message type. The message may serve to notify the authorised user (or authorised users) that a partially fulfilled job awaits at the fulfilment service device. Responsive to receipt of the message, the user may retrieve the partially fulfilled job from the fulfilment service device. If no instruction is received to resume processing of the paused job within the pre-defined period (i.e. the time count (T), as measured by the pause timer, is equal to, or exceeds a pre-defined time count ($T_P$)) then the control module may issue the job-cancel instruction.

In an example implementation, the control module, upon determining that location policy is not satisfied after a fulfilment operation is completed, may issue an instruction to effect transmission of a message from the controller to a message receiving device of the user (or messaging receiving devices of at least one of the users who are authorised to initiate fulfilment of the job, as identified in the identity policy). The message may be in the form of an SMS message or e-mail message, or other suitable message type. The message may serve to notify the authorised user (or authorised users) that a completed job awaits at the fulfilment service device. Responsive to receipt of the message, the user may retrieve the completed job from the fulfilment service device. The message may be sent when the control module determines that location policy is not satisfied and/or the message may be sent after expiry of a pre-defined period. Therefore, in an example, when a fulfilment operation is complete, a message may be sent to a user (or at least one of the users who are authorised) if the location policy is not satisfied at completion of the job. Another message may be sent to the same user(s) and/or a different user(s) after expiry of a pre-defined period following completion of the job.

In an example implementation of the present disclosure, location of the authentication token relative to a fulfilment service device may be assessed to determine proximity based using, for example. Bluetooth low energy, near field communication, fingerprints, cameras, badge access to a room, etc. Identity can also be based on a credential or token that can be continuously vetted (for example, token validity, token expiry date, is the user leaving the company and hence the ID privilege should be reduced/revoked for printing existing documents in the server). Intent may be assessed based upon itinerary information for the user. For example, a user leaving a building for the remainder of the day may result in an itinerary policy not being satisfied (because the user has no intention to print). Therefore, if there is, for example, a one hour timeout for cancelling the job, a signal indicating that the user has left the office could be used to cancel the job immediately. Other examples of itinerary information include meeting times (e.g. itinerary policy requires that a job should not be started when the user's itinerary information indicates that the user is about to start a meeting or telephone call).

In an example implementation of the present disclosure, the controller for a fulfilment service operation may comprise a controller for a print service operation, the fulfilment service system may comprise a print service system and the fulfilment service device may comprise a printing device.

In an example implementation of the present disclosure, the authentication token may comprise a card bearing a storage element for storing user identity information.

In an example implementation of the present disclosure, the authentication token may be stored on an electronic device such as, for example, a mobile phone.

The invention claimed is:

1. A controller for a fulfilment service operation, comprising:
    a receiver to receive a document file, the document file comprising job data and policy data, the job data comprising data defining an item to be produced by a fulfilment service device;
    a location module to determine if physical location information associated with an authentication token carried by a user satisfies a location policy defined in the policy data;
    an identity module to determine if identity information associated with the authentication token satisfies an identity policy defined in the policy data;
    an itinerary module to determine if itinerary information associated with the authentication token indicates that the item is to be produced by the fulfilment service device prior to occurrence of an event contained in a calendar of the user, thereby satisfying satisfies an itinerary policy defined in the policy data;
    a control module to issue a job-proceed instruction responsive to receipt of an indication that the location policy, the identity policy and the itinerary policy are satisfied.

2. A controller according to claim 1, wherein the location module determines if the location policy is satisfied while a job is in progress and the control module issues a location policy violation instruction responsive to receipt of one of: an indication that the location policy is not satisfied; and a pause command received by the controller.

3. A controller according to claim 1, wherein the control module is to initiate at least one of:
    issue a job pause instruction responsive to receipt, during fulfilment of the job, of one of: an indication that the location policy is not satisfied; and a pause command received by the controller;
    transmission of a message confirming that a partially complete job is present at the fulfilment service device responsive to receipt, during fulfilment of the job, of one of: an indication that the location policy is not satisfied; and a pause command received by the controller; and transmission of a message confirming that a complete job is present at the fulfilment service device responsive to receipt, after fulfilment of the job, of an indication that the location policy is not satisfied.

4. A controller according to claim 1, wherein the identity module and itinerary module determine if the identity policy and itinerary policy are satisfied while a job is in progress and the control module issues a job-pause instruction responsive to receipt of one of: an indication that at least one of the identity policy and itinerary policy is not satisfied; and a pause command received by the controller.

5. A controller according to claim 2, wherein, responsive to the receipt of one of: the indication that at least one of the location policy, identity policy and itinerary policy is not satisfied; and the pause command, the control module initiates a job-pause timer.

6. A controller according to claim 5, wherein the control module is to monitor a time count of the job-pause timer and, responsive to the time count exceeding a pre-defined time count, the control module issues a job-cancel instruction.

7. A controller according to claim 5, wherein responsive to receipt of one of: an indication that at least one of the location policy, identity policy and itinerary policy is not satisfied; and the pause command, the control module sends, to a job progress store, location data indicative of a location in the job where progress was paused.

8. A controller according to claim 7, wherein responsive to receipt of an indication that the location policy, identity policy and itinerary policy are satisfied, and an input command instructing resumption of a paused or cancelled print job, the control module retrieves the location data from the job progress store and issues a job-resume instruction, which includes the location data.

9. A controller according to claim 1, wherein the location policy comprises a proximity rule that requires the authentication token to be at least one of: located within a pre-defined area for the location policy to be satisfied; and located less than a pre-defined distance from the fulfilment service device for the location policy to be satisfied.

10. A fulfilment service system, comprising:
a controller according to claim 1;
a communication device to communicate with an authentication token carried by a user and to retrieve physical location information associated with the authentication token carried by the user, identity information and itinerary information associated with the authentication token responsive to establishing a communications link with the authentication token and to communicate the retrieved physical location information, identity information and itinerary information to the controller;
a memory to store a location policy, an identity policy and an itinerary policy, the controller to retrieve the location policy, identity policy and itinerary policy from the memory responsive to receipt of the physical location information, identity information and itinerary information;
a job distribution module to receive the job data from the receiver of the controller, to store the job data in the memory and to retrieve the job data from the memory and to forward the job data to a fulfilment service device responsive to receipt of a job-proceed instruction from the controller.

11. A fulfilment service device, comprising:
an input interface to receive a document file comprising job data from an instructing device;
a controller according to claim 1;
a communications device communicatively coupled to the fulfilment service device, the communication device to communicate with an authentication token carried by a user and to retrieve physical location information associated with the authentication token carried by the user, identity information and itinerary information associated with the authentication token responsive to establishing a communications link with the authentication token and to communicate the retrieved physical location information, identity information and itinerary information to the controller;
a memory to store a location policy, an identity policy and an itinerary policy, the controller to retrieve the location policy, identity policy and itinerary policy from the memory responsive to receipt of the physical location information, identity information and itinerary information;
a fulfilment engine to implement fulfilment of the job responsive to receipt of a job-proceed instruction from the controller.

12. A fulfilment service device according to claim 11, wherein the fulfilment engine is to at least one of:
pause a job responsive to receipt of a job-pause instruction from the controller; and cancel a job responsive to receipt of a job-cancel instruction from the controller.

13. A fulfilment service device according to claim 11, wherein the fulfilment engine is to resume a paused or cancelled job responsive to receipt of a job-resume instruction from the controller.

14. A non-transitory machine-readable storage medium encoded with instructions executable by a processor, the machine-readable storage medium comprising:
instructions to extract from a received document file job data and policy data, the job data comprising data defining an item to be produced by a fulfilment service device;
instructions to implement a location module to determine if physical location information associated with an authentication token carried by a user satisfies a location policy defined in the policy data;
instructions to implement an identity module to determine if identity information associated with the authentication token satisfies an identity policy defined in the policy data;
instructions to implement an itinerary module to determine if itinerary information associated with the authentication token indicates that the item is to be produced by the fulfilment service device prior to occurrence of an event contained in a calendar of the user, thereby satisfying satisfies an itinerary policy defined in the policy data; and
instructions to implement a control module to issue a job-proceed instruction responsive to receipt of an indication that the location policy, the identity policy and the itinerary policy are satisfied.

15. A printing device, comprising:
an input interface to receive a document file comprising a print job from a print job instructing device;
a controller according to claim 1;
a communications device communicatively coupled to the printing device, the communication device to communicate with an authentication token carried by a user and to retrieve physical location information associated with the authentication token carried by the user, identity information and itinerary information associated with the authentication token responsive to establishing a communications link with the authentication token and to communicate the retrieved physical location information, identity information and itinerary information to the print operation controller;
a memory to store a location policy, an identity policy and an itinerary policy, the print operation controller to retrieve the location policy, identity policy and itinerary policy from the memory responsive to receipt of the physical location information, identity information and itinerary information;
a print engine to print the print job responsive to receipt of a print-proceed instruction from the print operation controller.

* * * * *